3,528,841
METHOD FOR REDUCING TACKINESS
OF POLYMER PELLETS

Charles R. Donaldson, Tuscola, Ill., and James S. Yang, Cincinnati, Ohio, assignors to National Distillers and Chemical Corporation, New York, N.Y., a corporation of Virginia
No Drawing. Filed Nov. 15, 1967, Ser. No. 683,151
Int. Cl. B44d 1/094; B32b 5/16
U.S. Cl. 117—16                                              5 Claims

ABSTRACT OF THE DISCLOSURE

The use of microfine polyolefin powder as parting agents for polymer pellets.

BACKGROUND OF THE INVENTION

Field of invention

This invention relates to an improved method for preventing the agglomeration or sticking of polymeric articles, such as pellets, by the application of an improved parting agent to the surfaces of the article.

The prior art

It has been previously proposed to decrease the tackiness and thereby improve the ease of handling of polymer pellets by coating the same with polyolefin powders such as polyethylene, polypropylene, etc. In particular, it has been proposed to reduce the tackiness of pellets of isobutylene polymer or butyl rubber by coating thereon from 0.1 to 10% by weight of powdered solid polyethylene having a particle size of from about 30 to about 500 microns.

It has also been proposed to employ such parting agents as silica, talc, fuller's earth, etc. to reduce the tackiness of polymeric resins.

All of these prior art methods give rise to disadvantageous results, however. Thus, when employing such materials as silica, talc, etc., the chemical properties of the thus coated polymer pellets are altered. For example, when it is desired to use substantially pure polymer pellets for molding purposes, it is apparent that parting agents such as silica, talc, etc., cannot be employed as the purity of the resulting article will be lessend.

Although polyolefin coating materials have properties more similar to the polymer pellets than silica, talc, etc., nevertheless, the employment of undue amounts of the polyolefin parting agent will affect the properties thereof. While it has been proposed to coat polymeric pellets with as small amounts as 0.1% of a powdered polyethylene having a particle size as small as 20 microns, such pellet mixtures, while having a reduced degree of tackiness, are still unsuitable for various applications.

For example, the coarser additives of the prior art have an inherently higher melting point and cause gels and other imperfections to occur in the surfaces of the ultimately formed articles. This disadvantage is particularly troublesome in the area of thin films and coatings. Moreover, these coarse particle additives detrimentally affect the adhesive properties of the surfaces in which they are incorporated. One reason for this is that the large particles actually breach the plastic surface and protrude therethrough resulting in less contact area in the surface. Also, inasmuch as the particles are larger, a greater weight thereof is required to achieve the desired surface parting effect.

There is lacking in the prior art, therefore, a method for reducing the tackiness of polymer pellets while leaving the purity and properties thereof unaffected.

BRIEF SUMMARY OF THE PRESENT INVENTION

According to the present invention, the tackiness of polymeric pellets and similar resinous articles is decreased and the ease of handling thereof increased by coating thereon a parting agent consisting essentially of polyolefin powders having a microfine particle size. By microfine is meant a particle size wherein the polyolefin powder is substantially devoid of particles greater than 25 microns and further, wherein the average particle size is less than 10 microns and wherein the particles are of spherical shape.

By employing microfine polyolefin powders smaller amounts of polyolefin parting agent are required to achieve the same or greater reduction in tackiness than heretofore achieved, while at the same time, achieving a higher degree of purity. Moreover, the employment of microfine polyolefin powders greatly reduces the effect of the parting agent on the properties of the coated polymer articles.

It is an object of the present invention to provide methods for reducing the tackiness and improving the ease of handling of polymer pellets or similar polymeric materials.

It is a further object of the present invention to provide methods for improving the tackiness of polymer pellets or similar polymeric materials while maintaining a high degree of purity and without affecting the properties thereof.

DETAILED DESCRIPTION OF THE INVENTION

Recently, there has been proposed a method for preparing microfine particle size polyolefin powders. This method is fully described in co-pending application, Ser. No. 370,006, filed May 25, 1964, now U.S. Pat. No. 3,422,049 issued Jan. 14, 1969. Briefly, the method of this patent comprises subjecting a polyolefin to vigorous agitation at elevated temperature and pressure in the presence of water and a block co-polymer of ethylene oxide and propylene oxide as the dispering agent. More specifically, the method comprises heating the polyolefin material in the presence of water and the dispersing agent to at least a temperature where the melt flow rate of the polyolefin exceeds 15, and more preferably 20, in order for the polyolefin to be sufficiently fluid to be finely dispersed by mechanical stirring.

The dispersing agents are water soluble block co-polymers of ethylene oxide and proylene oxide having a molecular weight above about 3500 and containing a major portion by weight of ethylene oxide. Representative of such compounds are several of the non-ionic surface active agents marketed by Wyandotte Chemicals prepared (see the Pluronic Grid Approach, vol. II, Wyandotte Chemicals Corp., 1957) by polymerizing ethylene oxide on the ends of a preformed polymeric base of polyoxypropylene. Both the length or molecular weight of the polyoxypropylene base and the polyoxyethylene end segments can be varied to yield a wide variety of products. For example, one of the compounds discovered as suitable for the practice of the process of Pat. No. 3,422,049 is Pluronic F-98 wherein a polyoxypropylene of average molecular weight of 2,700 is polymerized with ethylene oxide to give a product of molecular weight averaging about 13,500. This product may be described as containing 20 weight percent of propylene oxide and 80 weight percent of ethylene oxide.

Examples of other effective pluronics include P–105 (M.W. 6,500, 50% propylene oxide, 50% ethylene oxide), F–88 (M.W. 11,250, 20% propylene oxide, 80% ethylene oxide), F–108 (M.W. 16,250, 20% propylene oxide, 80% ethylene oxide), and P–85 (M.W. 4,500, 50% propylene oxide, 50% ethylene oxide). These compounds, containing at least about 50 weight percent of ethylene oxide and exhibiting a molecular weight of at least about 4,500, are particularly effective as dispersing agents for the aforementioned thermoplastic polymers.

In carrying out the above described process, the selected polyolefin is first contacted with water and the dispersing agent. The dispersing agent need not be incorporated into the polymer prior to the introduction of the water by such means as milling and the like, but may be introduced into the dispersing apparatus simultaneously with the other ingredients or as a solution in the aqueous phase. If desired, the dispersion process may be operated in a continuous manner, in which case it is convenient to premix the desired ratio of dispersing agent, water, and polymer, and introduce this mixture continuously to the reactor while continuously removing from another part of the reactor the product dispersion.

The amount of water used in relation to the polymer dispersed generally ranges from about 0.33 to 9 parts by weight of water per part of normally solid polymer, preferably between about 0.8 and 4 parts per part of polymer. To prepare dispersions which are more dilute, it is usually more economical to dilute a more concentrated dispersion. Dispersions containing more than about 75 percent of polymer are generally quite viscous and difficult to handle. To a limited extent the dispersion becomes finer as the concentration of polymer increases, other conditions being held constant.

As little as about 0.5 part by weight of dispersing agent per 100 parts of normally solid polymer may be used to produce the desired dispersions, however, it is preferred to use from about 2 to 25 parts of dispersing agent per 100 parts of polymer. Larger ratios of dispersing agent exhibit no significant influence on the fineness of dispersion and tend to make subsequent removal of the surfactant from the polymer more difficult.

Where it is desired to prepare polymers at very fine particle size, for example, olefin homopolymers and olefin co-polymers whose average particle size is below about 10 microns, upon feeding the ingredients to the dispersing device the temperature is brought to a level at which the melt flow rate of the polymer being dispersed is at least 15, and more preferably at least 20. Generally, the temperature at which the polymers exhibit melt flow rates of at least 15 ranges from about 110° C. for low molecular weight polymers, e.g., low molecular weight low density polyethylene, up to the critical temperature of water for the relatively high molecular weight and highly crystalline polymers. For the preferred polymers, dispersion temperatures range from about 160° to 325° C. For example, a polymer such as a linear polyethylene with a flow rate of 10 at 190° C. requires a dispersion temperature of about 245° C., whereas a polymer such as a polypropylene with a melt flow rate of 7 at 230° C. requires a dispersion temperature above about 265° C. As aforementioned, the use of lower temperatures, that is, down to the melting point of the polymer, will also yield dispersions, but of a coarser particle size.

The pressure under which the process of Pat. No. 3,422,049 is carried out is so adjusted to exceed the vapor pressure of water at the operating temperature so as to maintain a liquid water phase. More particularly, the pressures may range from about 1 to 217 atmospheres, and preferably from about 6 to 120 atmospheres. In cases where the polymer is sensitive to air at the elevated dispersion temperatures, an inert gas, e.g., nitrogen or helium, may be substituted for the air normally present, and deaerated water used. In the process of the present invention tackiness is reduced and handling improved by coating polymer pellets with finely divided polyolefin powders. Generally, any polyolefin may be employed to achieve the objects of the present invention. The most preferred, however, are polyethylene and polypropylene or mixtures thereof. These polyolefins are the most inexpensive to produce and provide the greatest degree of reduction in tackiness while permitting the attainment of a high degree of purity.

The method of the present invention is generally applicable to any polymeric material having a high degree of tackiness. Examples of such polymeric materials are vinyl acetate polymers and copolymers, poly-isobutylene, butyl rubber, isoprene rubber, styrene-butadiene copolymers, chloroprene, etc.

The invention has been found most effective for the reduction of tackiness of vinyl acetate polymers and co-polymers. Pellets of vinyl acetate polymers and co-polymers are highly tacky, resulting in their agglomeration upon storing for long periods of time in large quantities. Moreover, in handling these vinyl acetate pellets by conventional procedures, such as airveying and blending, these pellets readily agglomerate, necessitating frequent interruptions of these operations. By coating vinyl acetate polymers and vinyl acetate co-polymer pellets with microfine polyolefin powders, the aforementioned problems are virtually eliminated. Moreover, no noticeable sacrifice in the degree of purity or effect on the properties of the pellets is produced.

The microfine polyolefin powders may be coated on the polymer pellets according to a variety of methods. For example, the microfine polyolefin powder may be slurried in the water employed as the cooling water or fly knife water in the cutting operation following extrusion of the polymeric compositions to produce the pellets. According to this method, the extruded polymeric material is cut into pellets by high speed knives while in suspension in water. By dispersing the microfine powder in the water, the powder is coated onto the polymer pellets as they are produced.

According to another method, the microfine powder may be mixed with the already formed polymer pellets and agitated by tumbling or airveying, etc.

Another alternative comprises the electrostatic transfer method described by J. C. Barford et al. in U.S. Pat. No. 3,248,253, patented Apr. 26, 1966. Briefly, that method comprises electrostatically charging a bath of fluidized polyolefin powder with a potential different from that of the polymer pellets, such that the charged polyolefin powder particles are attracted by and secured as a uniform layer over the surfaces of the polymer pellets.

It is to be understood, however, that any coating method suitable for the deposition of powdered materials may be employed to achieve the objects of the present invention.

As mentioned above, by microfine polyolefin powder is meant a polyolefin powder having an average particle size of less than 10 microns, wherein said powder is substantially devoid of particles greater than 25 microns and wherein the particles are of spherical shape.

Generally, any desired amount of polyolefin powder may be employed to coat the polymeric pellets, the tackiness of which it is desired to reduce. The invention, however, has its most beneficial application in reducing the tackiness of polymeric pellets where it is also desired to retain a high degree of purity in the treated polymer. The method of the present invention enables the employment of less amounts of di-tackifier than heretofore employed, to achieve a similar or greater reduction in tackiness with no sacrifice in purity.

Generally, amounts in the range of from about 0.025% to about 0.1% by weight are sufficient.

For those applications requiring a highly pure polymeric pellet composition, the amount of polyolefin powder coating material should be regulated so as to yield a composition containing less than about 0.1% of coating material.

The invention is further illustrated by the following non-limiting examples.

Example I (A) 300 parts of a polyethylene having a density of 0.924 g./cc. and a melt flow rate of 8 g. per 10 min. at 190° C. in the form of small chips, 18 parts of a block co-polymer of ethylene oxide and propylene oxide of a molecular weight of 13,500 and containing 20 percent by weight of propylene oxide and 80 percent by weight of ethylene oxide (Pluronic F–98), and 273 parts of de-aerated water were charged to the reactor. The air was replaced by nitrogen and heat was applied until the temperature of the mixture reached 260° C. at a pressure of 760 p.s.i. Stirring was then started and continued at a rate of 8,000 to 10,000 r.p.m. for a period of 8 to 10 minutes. Stirring was then discontinued, and the temperature of the dispersion was allowed to drop under ambient cooling to about 90° C. The residual pressure was then bled off, the obtained dispersion was diluted with an equal volume of water, and this mixture was suction-filtered on a Buchner funnel fitted with a #41 H Whatman filter paper. The residue was washed thoroughly with water and then dried for 4 hours at 60° C. 270 parts of a fine white powder was recovered. Microscopic examination revealed all of the particles as almost perfect spheres and substantially all (greater than 99 percent) of the particles below 25 microns in size, the number average particle size being less than 10 microns.

Example II

A water slurry of microfine polyethylene powder prepared according to the method of Example I containing 1.66% of powdered polyethylene was poured into a fly knife cutting apparatus and employed as the cooling water in the following cutting operation.

Fifty pounds of vinyl acetate co-polymer XA–500 (22% vinyl acetate) having a melt index of 108–118 pellets were placed in a suitable extrusion hopper, and allowed to stand for thirty minutes. The polyolefin powder containing cooling water was circulated and the vinyl acetate co-polymer extruded into the fly knife cutting apparatus and converted therein into pellets.

The pellets were airveyed into a run down silo and blended in the silo for thirty minutes. No agglomeration was observed during the airveying and blending operations. Moreover, no agglomeration was observed during long period storage of large bulk quantities of the polymer pellets. Analysis of the coated and blended pellets revealed a melt index of 113. This indicated no change whatsoever in the purity of the polymer pellets which had a melt index of between 108 and 118 prior to the coating operation.

Example III

A method identical to that described in Example II was carried out except that no microfine polyolefin powder was added to the fly knife cooling water. Following extrusion and cutting into pellets, the composition was airveyed and blended as in Example II. Extreme difficulty was encountered due to a high degree of agglomeration during these operations. Moreover, after long periods of storage in large bulk quantities, the polymer pellets agglomerated into large aggregates rendering them unsuitable for use.

What is claimed is:

1. A method for reducing the tackiness of solid polymer pellets comprising coating said pellets with a parting agent consisting essentially of a polyolefin powder having an average particle size less than 10 microns, being substantially devoid of particles in excess of about 25 microns in size, and being substantially spherical in shape.

2. A method according to claim 1 wherein said polymer pellets are composed of a material selected from the group consisting of vinyl acetate polymers and vinyl acetate co-polymers.

3. A method according to claim 1 wherein said polyolefin is selected from the group consisting of polyethylene, polypropylene and mixtures thereof.

4. A method according to claim 1 wherein said solid polymer pellets are coated with from about 0.025% to about 0.1% of said polyolefin powder.

5. A method according to claim 1 wherein said solid polymer pellets are contacted with an aqueous slurry of said polyolefin powder, followed by drying.

References Cited

UNITED STATES PATENTS

| | | | |
|---|---|---|---|
| 3,422,049 | 1/1969 | McClain | 260—29.6 |
| 3,248,253 | 4/1966 | Barford et al. | 117—17 |
| 3,217,113 | 11/1965 | Willson et al. | 117—161 X |
| 3,073,790 | 1/1963 | Bosoni | 117—161 X |
| 2,898,233 | 8/1959 | Hmiel | 117—161 X |
| 2,895,939 | 7/1959 | Stober et al. | 117—100 X |
| 2,678,285 | 5/1954 | Browning | 117—161 X |

FOREIGN PATENTS

| | | |
|---|---|---|
| 928,120 | 6/1963 | Great Britain. |
| 1,025,280 | 4/1966 | Great Britain. |
| 1,041,014 | 9/1966 | Great Britain. |

WILLIAM D. MARTIN, Primary Examiner

M. R. P. PERRONE, Jr., Assistant Examiner

U.S. Cl. X.R.

117—100, 138.8, 161